United States Patent [19]
Kubozuka

[11] 4,442,814
[45] Apr. 17, 1984

[54] SPARK TIMING CONTROL SYSTEM

[75] Inventor: Takao Kubozuka, Yokosuka, Japan

[73] Assignee: Nissan Motor Co., Ltd., Yokohama, Japan

[21] Appl. No.: 367,925

[22] Filed: Apr. 13, 1982

[30] Foreign Application Priority Data

Apr. 15, 1981 [JP] Japan .............................. 56-54001[U]

[51] Int. Cl.³ ............................................... F02P 5/04
[52] U.S. Cl. .................... 123/425; 123/435; 73/119 R
[58] Field of Search ................... 123/425, 435; 73/119

[56] References Cited

U.S. PATENT DOCUMENTS

| 4,061,116 | 12/1977 | Saida | 123/425 |
| 4,111,035 | 9/1978 | West et al. | 123/425 |
| 4,153,020 | 5/1979 | King | 123/425 |
| 4,211,194 | 7/1980 | Hattori et al. | 123/425 |
| 4,261,313 | 4/1983 | Iwata et al. | 123/425 |
| 4,279,143 | 7/1981 | Gaipauo | 123/425 |
| 4,282,841 | 8/1981 | Takagi et al. | 123/425 |
| 4,370,963 | 2/1983 | Iwata | 123/425 |

FOREIGN PATENT DOCUMENTS

| 2049238 | 12/1980 | United Kingdom | 123/425 |
| 2052631 | 1/1981 | United Kingdom | 123/425 |

Primary Examiner—Ronald B. Cox
Attorney, Agent, or Firm—Schwartz, Jeffery, Schwaab, Mack, Blumenthal & Koch

[57] ABSTRACT

A spark timing control system for reducing engine noise in an internal combustion engine utilizing a sensor for detector for detecting engine vibration, a filtering device receiving the output of the sensor and passing frequency components within a range of 500 to 2000 Hz, and a generating circuit responsive to the passed frequency components for generating an output signal when the level of the passed frequency outputs exceeds a reference value. Spark timing is retarded when the output signal is received from the generating circuit thereby reducing engine noise.

13 Claims, 8 Drawing Figures

4,442,814

SPARK TIMING CONTROL SYSTEM

BACKGROUND OF THE INVENTION

1. Field of the Invention

This invention relates to an improvement in a spark timing control system for an internal combustion engine which is useful in decreasing engine noise.

2. Description of the Prior Art

Recently, with the advance of electric controls in various fields, the spark timing of internal combustion engines tends to be electrically controlled. It is thus possible to control combustion within an engine combustion chamber at an optimum condition. Such spark timing control is carried out by a spark timing control system which is operatively connected to a plurality of spark plugs and forms one of the most essential parts of an engine control system.

BRIEF SUMMARY OF THE INVENTION

In accordance with the present invention, a spark timing control system for an internal combustion engine, comprises a first device for sensing one of engine noise and engine vibration to generate an output signal corresponding thereto. The output signal is supplied to a second device for generating an output signal when the level of the output signal of the first device exceeds a reference level. Additionally, a third device is provided to retard the spark timing of the engine in response to the output signal of the second device. With this arrangement, the spark timing is controlled to be retarded at high levels of engine noise or vibration, thereby maintaining engine noise below an allowable limit.

BRIEF DESCRIPTION OF THE DRAWINGS

The features and advantages of the spark timing control system according to the present invention will be more appreciated from the following description in conjunction with the accompanying drawings, in which.

DETAILED DESCRIPTION OF THE INVENTION

Figure 1:
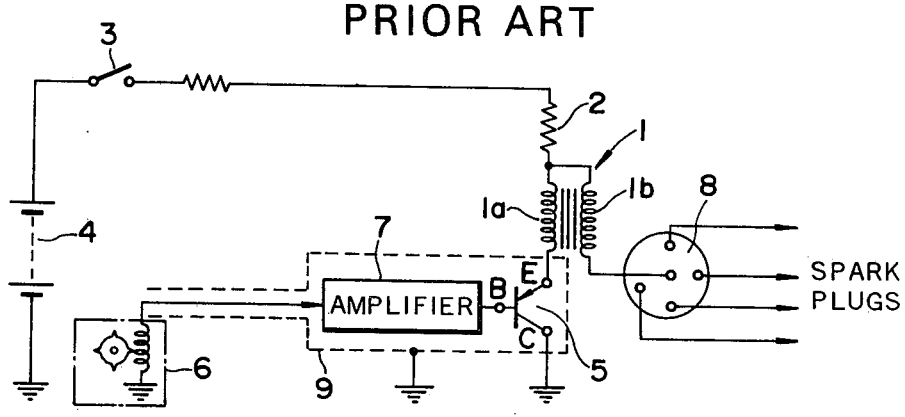
FIG. 1 is a circuit diagram of a conventional spark timing control system used in an internal combustion engine.
Figure 2:
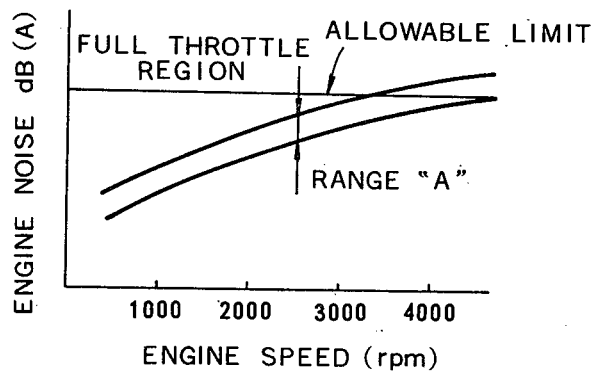
FIG. 2 is a graph illustrating shortcomings in connection spark timing control system.

Referring to FIGS. 1 and 2, a conventional spark timing control system will be described along with one of its major shortcomings. In the system of FIG. 1, an ignition coil 1 includes a primary winding 1a whose one end is electrically connected through a ballast resistor 2 and an ignition switch 3 to the positive terminal of a battery 4. The other end of the primary winding 1a is grounded through a power transistor 5. The power transistor 5 is controlled in response to the output signal from an amplifier circuit 7 which functions to amplify ignition pulses produced by a signal generator 6. Accordingly, a secondary winding 1b of the ignition coil 1 is electrically connected to a distributor 8 which is, in turn, electrically connected to a plurality of spark plugs, so that the output of the secondary winding 1b is supplied through the distributor to each spark plug. The reference numeral 9 denotes a shield member for the purpose of preventing the malfunction of the components contained therein.

With the thus arranged spark timing control system, after the ignition switch 3 has been closed, the signal generator 6 operates to generate intermittently ignition signals in timed relation to the rotation of an engine crankshaft. At a timing where the ignition signal is not generated by the signal generator 6, the power transistor 5 is controlled to be ON under the action of the amplifier circuit 7 and a primary current flows through the ignition coil primary winding 1a and the power transistor 5. On the contrary, at a timing where the signal generator 6 generates the ignition signal, the ignition signal is supplied to the base B of the power transistor 5 after amplified by the amplifier circuit 7. At this time, he power transistor 5 is momentarily forced off because of the fact that the signal from the amplifier circuit 7 is positive. As a result, the primary current of the ignition coil 1 is abruptly interupted, and therefore a high tension current is generated at the ignition coil secondary winding 1b. The thus generated high tension current is distributed successively to the spark plugs corresponding to respective engine cylinders under the action of the distributor 5. The signal generator 6 is arranged to control the generation timings of ignition signals, thereby controlling the spark timings of the engine.

However, the thus arranged spark timing control system has encountered the following shortcomings inasmuch as timings of the ignition signals are controlled only in response to engine speed and intake vacuum. In particular noise level difference within the range of 1–2 dB (A) is made among respective engines even though the engines are of the same kind. This noise level difference depends on a slight amount of scatter in construction, rigidity etc of respective engines. This scatter is exemplified by a range A in FIG. 2 in which overall engine noise is indicated as a function of engine speed. In some cases, engines within an oblique-lined range in FIG. 2 may emit noise over all allowable limit, particularly in case where the engine is operated at a spark timing near MBT under high engine speed and load condition such as in full throttle.

Figure 3:
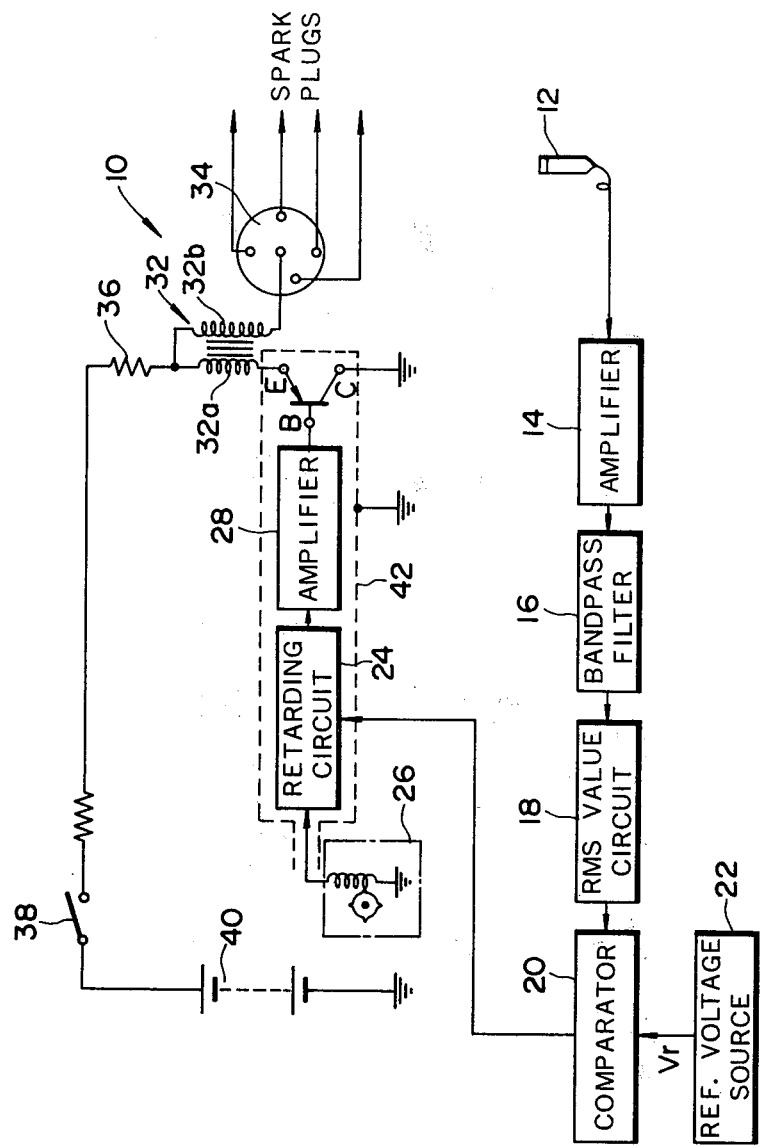
FIG. 3 is a circuit diagram of a preferred embodiment of a spark timing control system in accordance with the present invention.

In view of the above description of the conventional spark timing control system, reference is now made to FIG. 3, wherein a preferred embodiment of a spark timing control system of the present invention is illustrated by the reference numeral 10. The spark timing control system 10 in this embodiment is, for example, used for an automotive internal combustion engine though not shown. The spark ignition control system 10 omprises a sensor 12 for sensing noise or vibration of the engine and, as such, secured on, for example, an engine block (not shown) of the engine. The sensor 12 is electrically connected to an amplifier circuit 14 for amplifying the output signal of the sensor 12. The amplifier circuit 14 is, in turn, electrically connected to a bandpass filter 16 which suppresses frequencies outside a predetermined band width to extract the predetermined band width frequencies. The bandpass filter 16 is electrically connected to a RMS value circuit for providing the effective value or RMS (root mean square) value by processing the output signal of the bandpass filter 16 within a predetermined time span. The RMS value circuit 18 is electrically connected to a comparator 20 which is arranged to generate a signal "H" only when the level of the output signal of the RMS value circuit exceeds a reference value Vr from a reference voltage source 22, while it produces a signal "L" when the level of the output signal of the RMS value circuit 18 is below the reference value Vr.

The comparator 20 is, in turn, electrically connected to a retarding circuit 24 which is electrically connected between a signal generator 26 and an amplifier circuit 28. The signal generator 26 is, for example, of the type to generate ignition signals whose timings are controlled in response to engine speed and engine intake vacuum. The retarding circuit 24 is so arranged as to directly supply the output signal from the signal generator 26 to the amplifier circuit 28 when the comparator 20 provides the retarding circuit 24 with the signal "L," while to supply to the amplifier circuit 28 the output signal from the signal generator 26 after the timing of the output signal from the signal generator 26 is retarded a predetermined time duration, for example, 0.5 degree in crank angle in response to receipt of the "H" signal. The amplifier circuit 28 is electrically connected to the base B of a power transistor 30 whose emitter E is electrically connected to a primary winding 32a of an ignition coil 32 whose collector C is grounded. A secondary winding 32b of the ignition coil 32 is electrically connected through a distributor 34 to a plurality of spark plugs which are disposed within engine cylinders of the engine though not shown. The ignition coil 32 is electrically connected through a ballast resistor 38 to an ignition switch 38 which is, in turn, connected to a battery 40 as usual. The reference numeral 42 denotes a shielding member for preventing the malfunction of the spark timing control system 10, particularly of the retarding circuit 24, the amplifier circuit 28, and the power transistor 30.

In operation of the thus arranged spark timing control system 10, when the noise or vibration level of the engine is relatively low, the comparator 20 generates the signal "L" and therefore the retarding action of the retarding circuit 24 is not effected on the output signal from the signal generator 26. Thus the output signal from the signal generator 26 is directly provided through the amplifier circuit 28 to the base B of the power transistor 30. Accordingly, in this state, the ignition of the spark plugs takes place in accordance with the signal output timings of the signal generator 26 which timings are controlled in response to engine speed and engine intake vacuum as in the usual spark timing control systems.

When the noise or vibration level of the engine rises, the output of the sensor 12 rises so that high level output signals are supplied to the amplifier circuit 14. After amplified by the amplifier circuit 14, the signal is provided to the bandpass filter 16 in which only frequency components representing engine noise or vibration are picked up to generate the output signal corresponding thereto. The output signal of the bandpass filter 16 is supplied to the RMS value circuit 18 in which the RMS value within the predetermined time span is computed or given, and the output signal corresponding to the RMS value is applied to the comparator 20. When the output signal of the RMS value circuit exceeds the reference value Vr from the reference voltage source 22 corresponding to a condition whee the noise or vibration level of the engine exceeds an allowable limit or predetermined level, the output signal of the comparator 20 is inverted from "L" to "H" . Upon the signal "H" of the comparator 20, the retarding circuit 24 operates in a retarding mode. As a result, the ignition signal from the signal generator 26 is provided through the amplifier circuit 28 to the base B of the power transistor 30 after the timing of the ignition signal is retareded by 0.5 degree in crank angle under the action of the retarding circuit 24. Hence, the power transistor 30 is controlled with a time lag under a condition where the noise or vibration level of the engine exceeds the allowable limit. This retards the generation timing of the high tension current produced at the secondary winding 32b of the ignition coil 32, thus effectively retarding the spark timings of the spark plugs.

Figure 4:
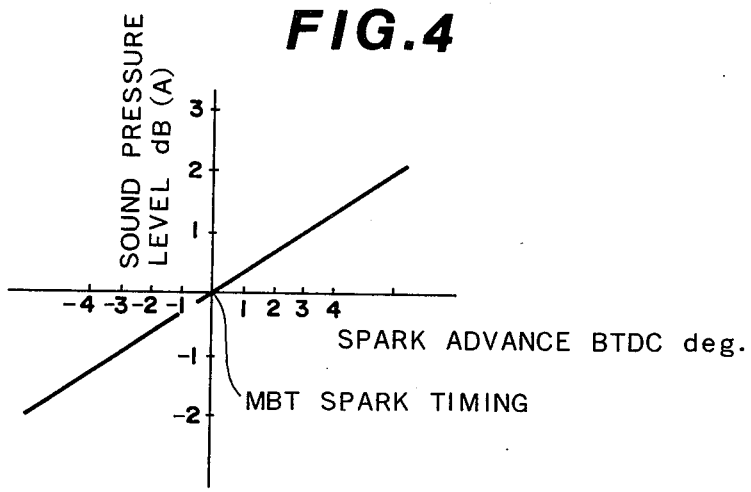
FIG. 4 is a graph showing the variation of engine noise characteristic on spark timing.

The advantageous effect the spark timing control system of the present invention will be explained hereinafter with reference to FIGS. 4, 5A, 5B, 6A and 6B. In this case, the relationship between engine noise and spark timing is shown in FIG. 4 which reveals that the sound pressure level lowers 1 dB upon the spark timing retardation of 3 degrees in crank angle relative to MBT (Minimum Advance for the Best Torque). Therefore, when the level of the frequency components passed by the bandpass filter 16 exceeds a predetermined allowable value, the retarding circuit 24 initiates its retarding action by the output signal from the comparator 20 and continues the action until the level of the frequency components lowers to a level below the predetermined allowable value, at which time, the comparator 20 stops generating the output "H" signal. Consequently the retarding circuit 24 interrupts its retarding action on the signal from the signal generator 26 and is gradually restored to the state where the retarding action is not made. It is to be noted that the loss of brake torque under the action of spark timing retardation of 3 degrees is within a range of from 0.1 to 0.5 Kgm in the vicinity of MBT and, as such, is negligible from the point of view of engine power output. The spark retardation by the retarding circuit 24 is within a range of ±10% relative to the preset or inherent spark advance characteristics.

Figure 6A:
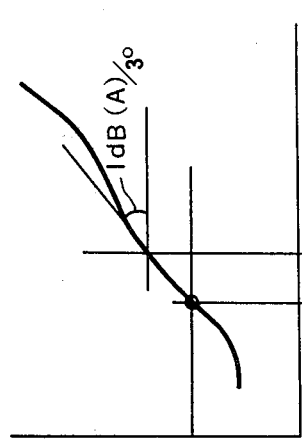
FIG. 6A is a graph showing the variation of engine noise level on spark timing of the engine.
Figure 6B:
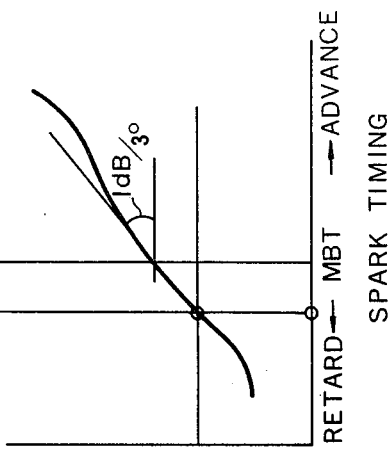
FIG. 6B is a graph similar to FIG. 6A, but showing the variation of vibration level of a cylinder block wall surface on spark timing.
Figure 5A:
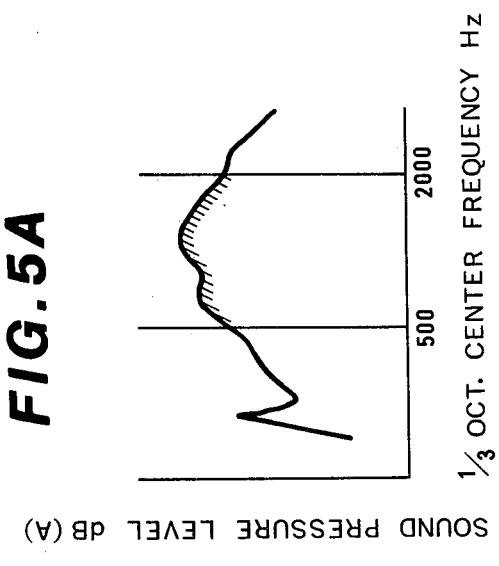
FIG. 5A is a graph showing the relationship between sound pressure level and vibration frequency of an engine.
Figure 5B:
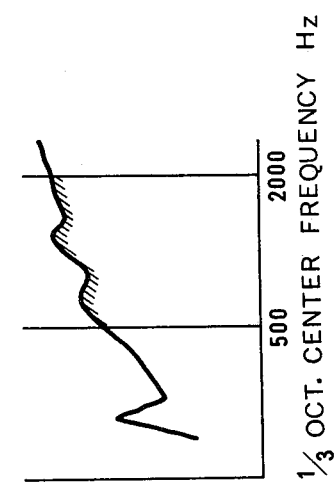
FIG. 5B is a graph showing the relationship between vibrational acceleration of a cylinder block and vibrational frequency of the engine.

It is preferable that the bandpass filter 16 is so arranged as to extract the frequency components within a range of 500–2000 Hz because of the fact that a predominant frequency range for engine noise is of 500 to 2000 Hz as shown in FIGS. 5A and 5B. In this connection, by virtue of retarding the spark timing under the action of the retarding circuit 24, the engine noise and vibration level of the cylinder block wall surface of the engine is considerably lowered as shown in FIGS. 6A and 6B in which the noise or vibration level of total vibrations with a 500–2000 Hz frequency range lowers at a rate of 1 dB per 3 degress (in crank angle) spark timing retardation. In this intance, the spark timing retardation by the retarding circuit 24 is made relative to the preset or inherent spark advance characteristics of the engine so that the spark timing within the engine noise level range of from 500–2000 Hz is controlled at a retarded side relative to MBT.

As appreciated from the above, according to the present invention, the spark timing control system is provided with the sensor for detecting engine noise or vibration related to engine noise, and so arranged as to control the spark timing to retard when the level of the output of the sensor exceeds the reference value, thereby always suppressing engine noise below the allowable limit.

What is claimed is:

1. A spark timing control system for reducing engine noise in an internal combustion engine, comprising:
    means for sensing one of engine noise and engine vibration and for generating a sensor output signal corresponding thereto;
    means responsive to said sensor output signal for filtering same, said filtering means passing frequency components within a range of 500 to 2,000 Hz;
    means responsive to said passed frequency components for generating an output signal when the level of said passed frequency components of said filtering means exceeds a reference value; and
    means for retarding the spark timing of the engine in response to the output signal of said generating means.

2. A method for reducing engine noise by controlling the spark timing of an internal combustion engine, comprising the steps of:
    sensing one of engine noise and engine vibration to produce a first signal corresponding thereto;
    passing a range of frequency components of said first signal corresponding to one of the engine noise and vibration within a range of 500 to 2000 Hz;
    comparing said frequency components of said first signal with a reference value to produce a second signal when the level of said first signal exceeds said reference value; and
    retarding the spark timing of the engine in response to said second signal.

3. A spark timing control system as claimed in claim 1, wherein said sensing means includes a sensor disposed adjacent said engine to generate the sensor output signal corresponding to one of said engine noise and engine vibration.

4. A spark timing control system as claimed in claim 3, wherein said generating means includes a comparator electrically connected to said sensor and arranged to compare the passed frequency components of said filtering means with said reference value.

5. A spark timing control system as claimed in claim 4, further comprising a reference voltage source electrically connected to said comparator, said reference value being a voltage level of said reference voltage source.

6. A spark timing control system as claimed in claim 4, wherein said retarding means includes a retarding circuit electrically connected to said comparator and arranged to retard the timing of an ignition signal which causes a spark plug to produce a spark, in response to an output signal from said comparator.

7. A spark timing control system as claimed in claim 6, wherein said filtering means comprises a bandpass filter electrically connected between said sensor and said comparator to extract said frequency components of the output signal of the sensor.

8. A spark timing control system as claimed in claim 6, further comprising a RMS value circuit electrically connected between said bandpass filter and comparator to give a RMS value of said passed frequency components of said bandpass filter and generate an output signal corresponding to the RMS value.

9. A spark timing control system as claimed in claim 6, further comprising a signal generator electrically connected to said retarding circuit to generate the ignition signal in timed relation to the operation of the engine.

10. A spark timing control system as claimed in claim 6, wherein said retarding circuit is arranged to control the spark timing to retard said timing relative to MBT.

11. A spark timing control system as claimed in claim 10, wherein said retarding circuit is arranged to control the spark timing to retard by 0.5 degree in crank angle.

12. A method as claimed in claim 2, wherein said retarding step includes the step of retarding the spark timing relative MBT.

13. A method as claimed in claim 12, said retarding step includes the step of retarding the spark timing by 0.5 degree in crank angle.

* * * * *